Aug. 21, 1962 — J. H. MANN — 3,050,250
REVOLUTION COUNTER
Filed Jan. 31, 1961 — 4 Sheets-Sheet 1
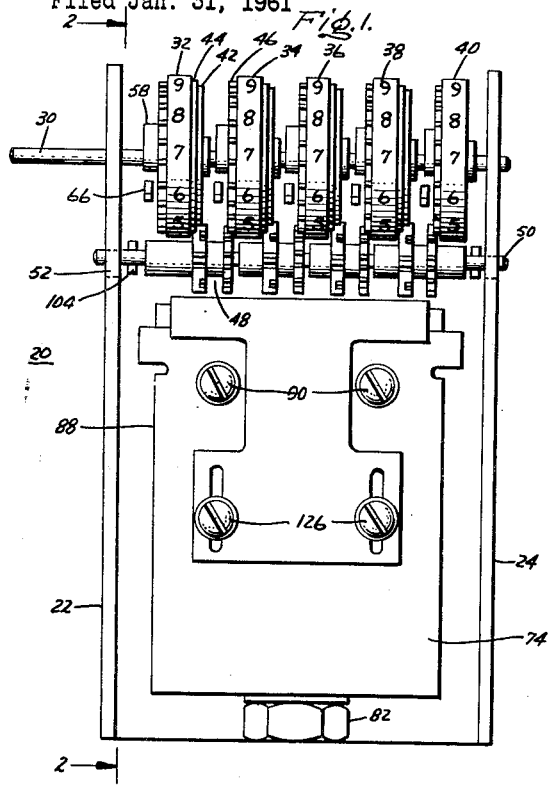
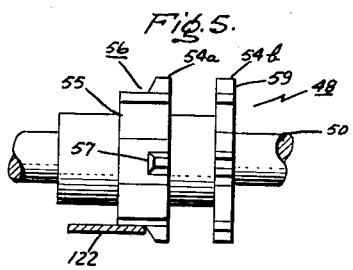
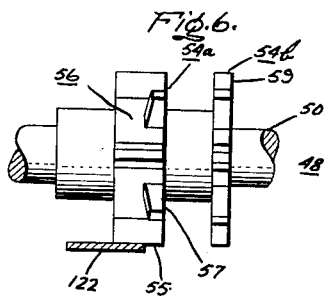
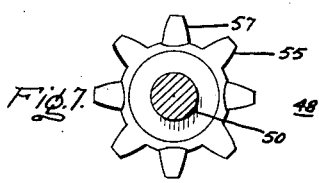
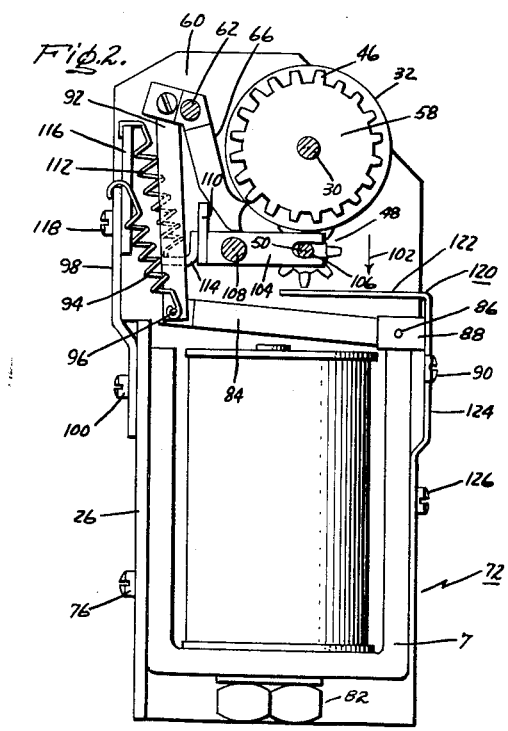
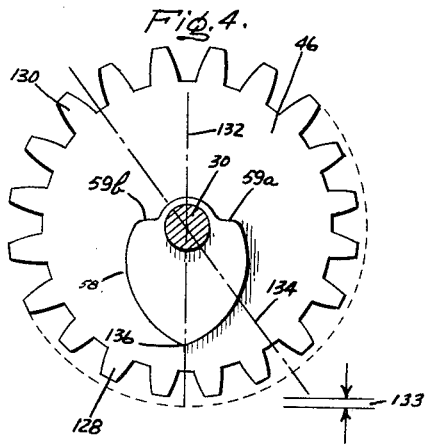
Inventor
Jabez H. Mann,
by Hurst & Ulrich
Attorneys.

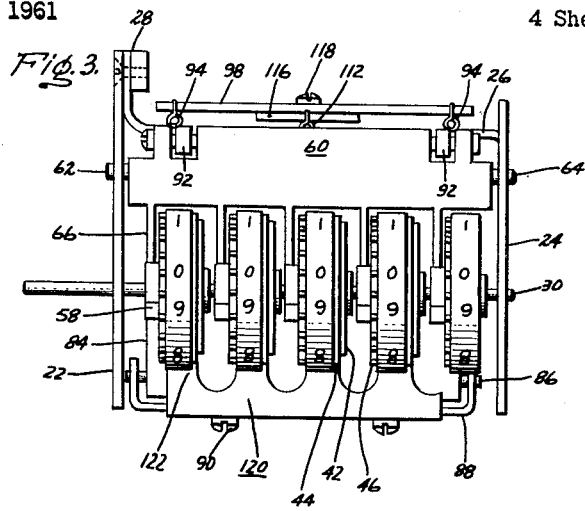
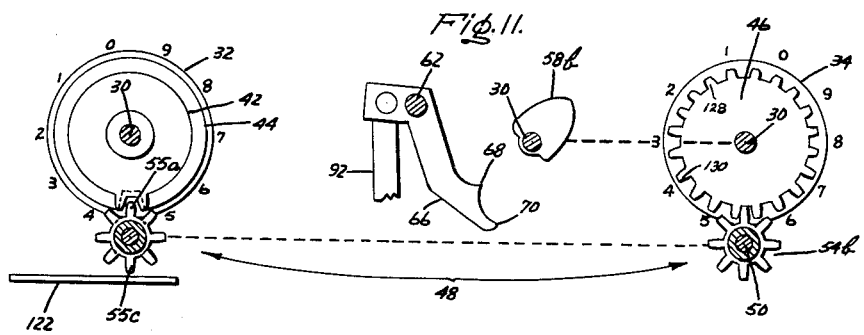
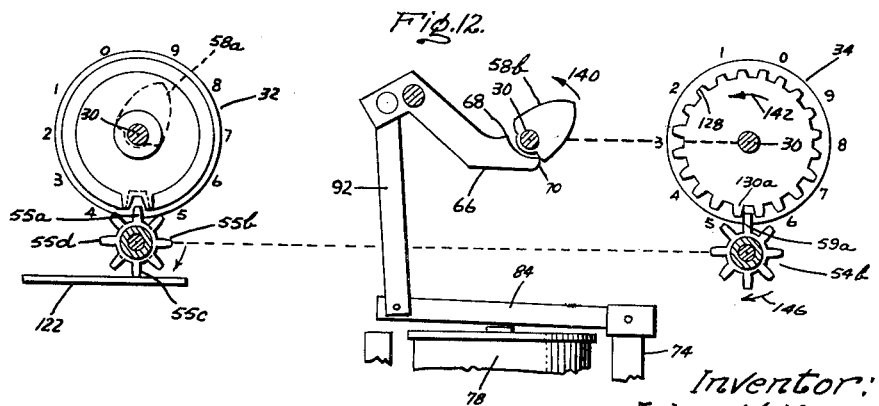

Aug. 21, 1962 J. H. MANN 3,050,250
REVOLUTION COUNTER
Filed Jan. 31, 1961 4 Sheets-Sheet 3

Inventor:
Jabez H. Mann,
by Lust & Irish
Attorneys.

Aug. 21, 1962   J. H. MANN   3,050,250
REVOLUTION COUNTER
Filed Jan. 31, 1961   4 Sheets-Sheet 4
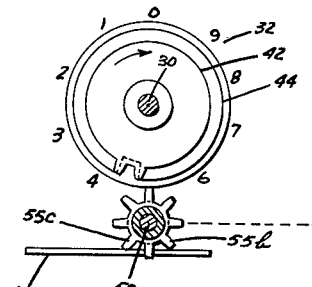
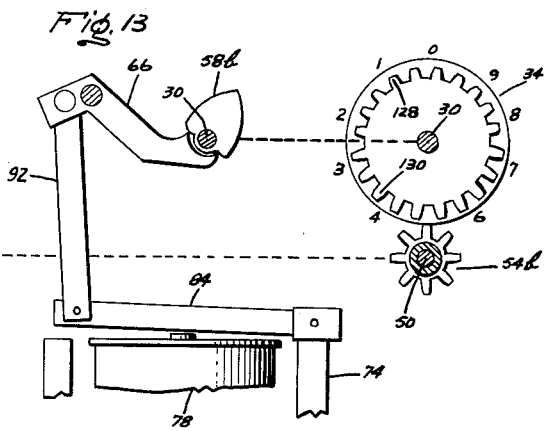
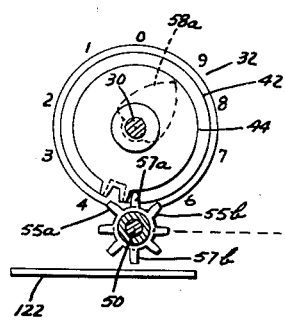
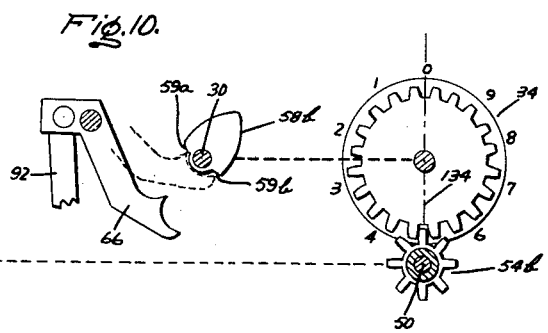
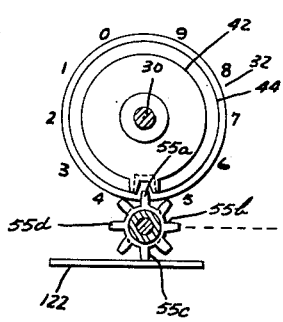
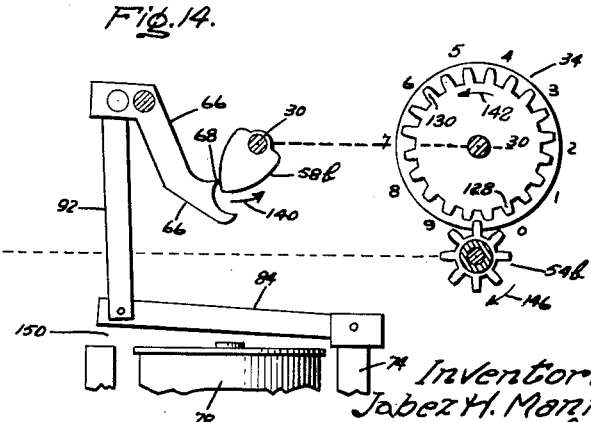

United States Patent Office 3,050,250
Patented Aug. 21, 1962

3,050,250
REVOLUTION COUNTER
Jabez H. Mann, Fort Wayne, Ind., assignor to Bowmar Instrument Corporation, Fort Wayne, Ind., a corporation of Indiana
Filed Jan. 31, 1961, Ser. No. 86,189
8 Claims. (Cl. 235—144)

This invention relates generally to revolution counters, and more particularly to revolution counters of the continuous rotation, impulse-reset type.

Revolution counters conventionally comprise a plurality of number wheels with intermittent motion transferring mechanism respectively interconnecting the wheels and advancing each higher order wheel a predetermined incremental amount in response to a predetermined rotation of the next lower order number wheel. A common form of intermittent motion transferring mechanism comprises a segmental gear, such as a two-tooth gear, and cooperating locking cam rotatable with the lower order number wheel, a full tooth gear rotatable with the higher order number wheel, and a transfer pinion having a full tooth portion interconnecting the gears and a mutilated portion having every other tooth removed cooperating with the locking cam.

There are applications where it is desirable simultaneously and substantially instantaneously to return or reset all of the number wheels of a revolution counter to a predetermined position, such as a zero indication, and one form of such a resettable counter is referred to as the continuous rotation, impulse-reset type, i.e., the input shaft continuously rotates except during the interval when the resetting operation is taking place. In order to reset the number wheels of such a counter, it is necessary to disengage the transfer pinions from the respective segmental and full tooth gears prior to returning the number wheels to the desired position. In such counters, the number wheels are conventionally reset by means of heart-shaped cams and cooperating operating arms which engage the cams and return the same to predetermined positions. In such a resettable counter, if the segmental gear and locking cam of any number wheel is in the course of a transfer at the instant of resetting, a full tooth of the transfer pinion is meshed with the segmental gear and locking cam and thus, since the reset position of the number wheel will ordinarily be other than a transferring position, it is necessary to rotate the pinion while it is disengaged from the segmental gear and locking cam so that the mutilated portion of the pinion will suitably engage the locking cam when the pinion is returned to its normal meshing position. This rotation of the transfer pinion has in the past been accomplished by means of a resilient reed plate which engages the pinion when the same is moved out of mesh and causes it to rotate the desired amount. However, there are instances in which a tooth of the pinion will engage the reed plate at substantially right angles thereto so that the pinion will not rotate and thus will not come back into mesh at the end of the resetting operation. In counters which are manually reset, such a situation can be tolerated since several successive actuations of the manual resetting lever will ordinarily provide sufficient vibration to cause the pinion to move away from its "top-dead-center" position and to rotate as desired so as to come back into mesh. There are applications, however, in which it is desired that the resetting operation be actuated by a solenoid in response to a single impulse in which therefore failure of a transfer pinion to rotate suitably and come back into mesh cannot be tolerated.

It is accordingly an object of my invention to provide an improved revolution counter of continuous rotation, impulse-reset type.

Another object of my invention is to provide an improved revolution counter of the continuous rotation, impulse-reset type in which meshing of the transfer pinions following resetting is positively assured.

Further objects and advantages of my invention will become apparent by reference to the following description and the accompanying drawings, and the features of novelty which characterize my invention will be pointed out with particularity in the claims annexed to and forming a part of this specification.

My invention in its broader aspects provides a transfer mechanism and number wheel resetting assembly for a revolution counter comprising a segmental gear, a full tooth gear, and a transfer pinion for operatively connecting the gears. The pinion is movable in a direction to come out of mesh with the gears and first and second cam means are provided respectively operatively connected to the segmental and full tooth gears and each having high and dwell portions. Means are provided respectively engageable with the cam means for moving the same to predetermined positions and for moving the pinion out of mesh with the gears. In accordance with my invention, the full tooth gear has a plurality of adjacent teeth which have a radial height less than that of the remaining teeth, the pinion meshing with the shorter teeth when the high portion of the second cam is positioned to be engaged by the respective operative means, and meshing with the higher teeth when the dwell portion of the second cam is positioned to be engaged by the respective operating means. Abutment means, such as a reed plate, are provided for engaging the pinion when the same is moved and for limiting the movement thereof. The abutment means is positioned so that the pinion moves a distance sufficient to come out of mesh with the short teeth but not sufficient to come out of mesh with the higher teeth of the full tooth gear when the pinion is positioned so that one tooth thereof engages the abutment means substantially at right angles thereto.

When the number wheel which is connected to the full tooth gear is positioned near its reset position, its cam is likewise similarly positioned so that the armature of a solenoid employed for actuating the cam operating means is close to its fully closed position and thus exerting maximum power. In this position, the transfer pinion meshes with the higher teeth of the full tooth gear and thus, by moving the transfer pinion partially out of engagement with the higher teeth (and likewise partially out of engagement with the teeth of the segmental gear), rotation of the cam and full tooth gear under the influence of the operating means and solenoid will cause a high tooth of the full tooth gear to engage a tooth of the pinion, there being sufficient power available in this position to sufficiently rotate the pinion so that the cooperation of the pinion moving means and the reed plate provides the additional requisite pinion rotation. However, when the number wheel is positioned so that its cam is at or near its maximum excursion, the armature of the solenoid will be at or near its de-energized position when the operating means engages the cam, minimum power thus being available at this position for initiating rotation of the cam. Under these circumstances, even though the transfer pinion has been moved partially out of engagement with the teeth of the full tooth gear, sufficient power may not be available to initiate rotation of the pinion by engagement with a tooth of the full tooth gear as above described. In accordance with my invention, a plurality of adjacent teeth of the full tooth gear are cut-down, these cut-down teeth meshing with the pinion when the cam is adjacent its maximum excursion. Thus, when the pinion is moved a distance sufficient to come out of mesh with the short teeth but not out of mesh with the full teeth, the solenoid and operating means will initiate rotation of the cam and gear without at that point effecting the pinion. As the cam and full tooth gear are rotated toward the reset position with the armature of solenoid moving toward its picked-up position (with the power available increasing inversely as the square of the air gap), a full tooth will engage the pinion to provide the requisite rotation, the momentum provided by initial free rotation of the cam and the full tooth gear and the increased power available from the solenoid cooperating to provide rotation of the pinion.

In the drawings:

FIG. 1 is a side elevational view of a continuous rotation, impulse-reset type counter incorporating my invention;

FIG. 2 is a cross-sectional view taken along the line 2—2 of FIG. 1;

FIG. 3 is a top view of the counter of FIG. 1;

FIG. 4 is an enlarged view showing a full tooth gear and heart-shaped cam in accordance with my invention;

FIG. 5 is a fragmentary side elevational view showing normal engagement of the transfer pinion with a reed plate finger;

FIG. 6 is a fragmentary side elemational view showing engagement of a full tooth of the transfer pinion with a reed plate finger;

FIG. 7 is an end view of the transfer pinion of FIGS. 5 and 6;

Figure 8:
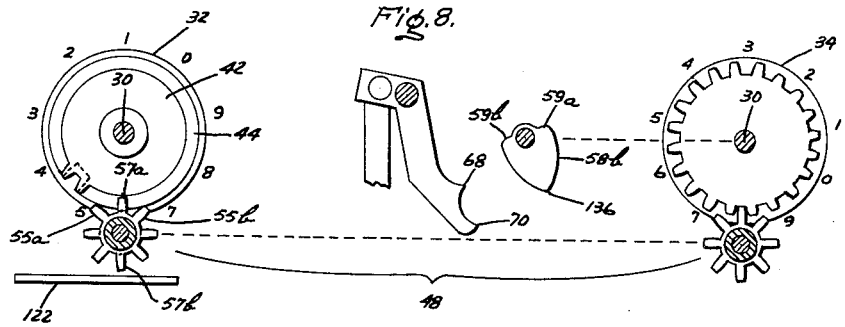
Figure 9:
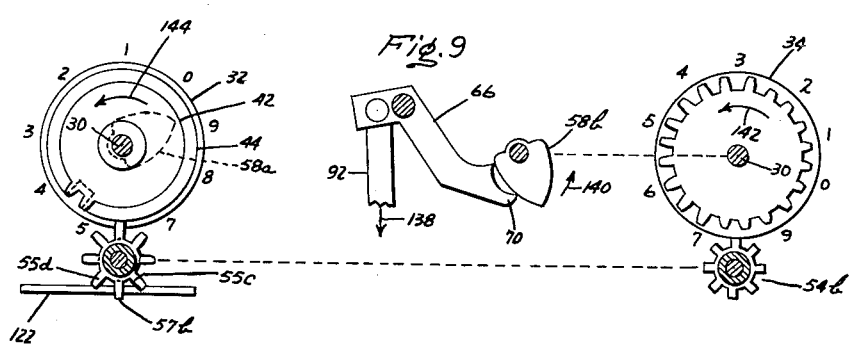
Figure 15:
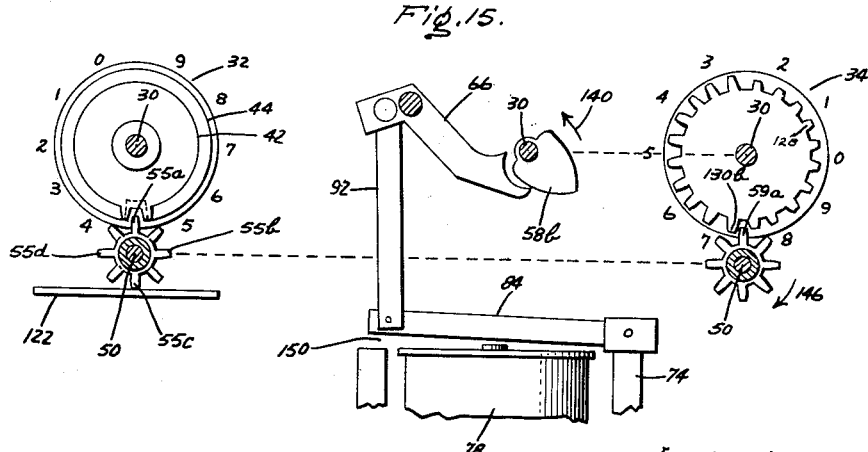

FIGS. 8 and 9 diagrammatically illustrate the operation of one transfer mechanism of the device of the previous figures during a normal resetting operation;

FIG. 10 diagrammatically illustrates the positions assumed by the elements of the transfer mechanism of FIGS. 8 and 9 following a resetting operation;

FIGS. 11, 12 and 13 diagrammatically illustrate the operation of my invention when resetting is initiated during a transfer and the higher order number wheel is near its reset position; and FIGS. 14 and 15 illustrate the operation of my invention when resetting is initiated during a transfer and the higher order number wheel is positioned so that the cam is near its maximum excursion.

Referring now to FIGS. 1 through 3 of the drawing, the counter of my invention, generally indicated at 20 comprises a frame formed of side plates 22 and 24, side plate 24 having a portion 26 formed at right angles thereto and joined to side plate 22 as at 28 thus forming a back plate. An input shaft 30 is suitably journalled in side plates 22 and 24 and has the lowest order number wheel 32 secured thereto and rotatable therewith. Higher order number wheels 34, 36, 38 and 40 are rotatably mounted on input shaft 30. A transfer mechanism interconnects each pair of number wheels, each such transfer mechanism comprising a two-tooth gear 42 and cooperating locking cam 44 secured to the lower order number wheel, a full tooth gear 46 secured to the higher order number wheel and a transfer pinion 48 rotatably mounted on pinion shaft 50. In the illustrated embodiment, pinion shaft 50 is disposed in vertical alignment with the input shaft 30 and vertical movement of pinion shaft 50 as hereinafter described, is accommodated by slots 52 in end plates 22 and 24.

Each of the transfer pinions 48 has a full tooth portion 54a and 54b and a multilated portion 56 in which every other tooth is removed. In the illustrated embodiment, full tooth gears 46 are provided with 20 teeth and pinion 48 has eight (8) full teeth, mutilated portion 56 thus having four teeth. In accordance with conventional practice, when pinion shaft 50 is in its normal position, full tooth portions 54a and 54b of the pinions 48 respectively mesh with the two tooth gears 42 and full tooth gears 46 while the mutilated pinion portions 56 respectively cooperate with the locking cams 44.

In order to provide for resetting the number wheels 32—40 to a predetermined position, here assumed to be a zero reading, each number wheel has a heart-shaped cam 58 secured thereto. A reset member 60 is provided pivotally mounted on side plates 22 and 24 by suitable pins 62 and 64 and having a plurality of reset arms 66 disposed between the number wheels and respectively in alignment with the heart-shaped cams 58. Each of the reset arms 66 has two spaced cam-actuating points 68 and 70 (FIG. 8) for operatively engaging the surface of the respective cam 58, as will be hereinafter described.

In order to actuate the reset member 60 and reset arms 66, a solenoid 72 is provided having a U-shaped magnetic frame 74 secured to the back plate 26 by means of a suitable screw 76. An operating coil 78 wound on a magnetic core element 80 is positioned between the legs of the magnetic frame 74 and is held in assembled position by means of a suitable stud 82 which passes through the base portion of the U-shaped frame 74 and engages the core 80. An armature member or clapper 84 is provided pivotally connected, as at 86 to a pivot member 88 which is secured to the U-shaped magnetic frame 74 by means of screws 90. Clapper 84 is in turn operatively connected to the reset member 60 by links 92. It will now be seen that when the coil 78 is energized, clapper 84 is magnetically attracted toward magnetic frame 74 thereby actuating the reset member 60 by means of links 92 so as to pivot the reset arms 66 upwardly in a direction to engage the cams 58. Clapper 84 is biased to its dropped-out position by means of a pair of springs 94 respectively connected at one end to pins 96 by which links 92 are pivotally connected to clapper 84, and at the other end to a plate member 98 adjustably connected to back plate 26 by means of screw 100. Thus, springs 94 serve resiliently to bias reset arms 66 to the positions shown in FIG. 2.

In order to move pinions 48 in the direction shown by the arrow 102 in FIG. 2 out of mesh with two-tooth gears 42 and full tooth gears 46, a pair of arms 104 are provided having slots 106 in the ends thereof which accommodate pinion shaft 50 and pivotally mounted on side plates 22 and 24 by pins 108. A plate 110 is secured to the end of the lever members 104 remote from the pinion shaft 50 and is engaged by reset arms 66 thereby to pivot lever members 104 upwardly to cause engagement of pinions 48 with the respective gears when the reset arms 66 are in their normal positions, as shown in FIG. 2. Reset arms 104 are further resiliently biased in a direction to cause pinions 48 to come out of mesh with the respective gears by means of a spring 112 having one end secured to a bracket 114 and its other end secured to a plate member 116 which is in turn adjustably secured to plate member 98 by a suitable screw 118. It will be readily apparent that the combined force exerted by springs 94 exceeds that exerted by spring 112 so that reset arms 66 are normally biased to their positions shown in FIG. 2 thereby in turn normally biasing lever members 104 so that pinions 48 are meshed with the respective gears. However, it will be seen that when coil 78 is energized thereby attracting clapper 84 toward magnetic frame 74 and in turn pivotally moving reset arms 66 upwardly toward engagement with cams 58, spring 112 will in turn pivot lever members 104 downwardly in the direction to bring pinions 48 out of mesh with the respective gears.

In order to limit the downward movement of pinions 48, a reed plate 120 is provided having a plurality of resilient fingers 122 disposed in a plane generally perpendicular to the plane of shafts 30 and 50. As best seen in FIGS. 5 and 6, the resilient fingers 122 are disposed so as to be respectively engaged by the mutilated portions 56 of pinions 48 only. Reed plate 120 has a mounting portion 124 which is adjustably mounted on magnetic frame 74 by screws 126.

Turning now particularly to FIG. 4, in accordance with my invention, the teeth 128 of a segment of each full tooth gear 46 are cut-down so that their radial height is less than that of teeth 130 of the remaining segment by a dimension 133. In the illustrated embodiment, the segment of full tooth gears 46 formed of the cut-down teeth 128 is 180° and thus there are ten adjacent cut-down teeth 128 and likewise ten adjacent full teeth 130. In a specific counter incorporating my invention, the cut-down teeth 128 have a radius of .322 inch whereas the full height teeth 130 have a radius of .337 inch thus providing a dimension 133 of .015 inch. Further, in the specific embodiment of my invention, the radial center line 132 of cams 58 is displaced by 36° from the radial center line 134 of the cut-down and full tooth segments of gears 46, the high point 136 of cams 58 being so oriented that three of the cut-down teeth 128 are disposed on one side thereof and seven on the other side thereof. It will be later comprehended however, that the particular orientation of cams 58 with respect to the cut-down teeth 128 of the full tooth gears 46 depends upon the geometry of the device and the numeral to which the number wheels are to be reset.

Turning now to FIGS. 8, 9 and 10, a pair of adjacent lower and higher order number wheels such as 32 and 34 are shown. In FIG. 8, it is assumed that number wheel 32 is displaying the numeral 1 and that number wheel 34 is displaying the numeral 3 at the instant coil 78 is energized so as to reset wheel 32 and 34 to display the zero indication. In the illustrated embodiment, the teeth of a two-toothed gear 42 are disposed between the numerals 4 and 5 of the number wheel 32 and the high point 136 of cam 58 is oriented to point toward the numeral 9. Thus, in the inital position of number wheels 32 and 34 as shown in FIG. 8, full teeth 55a and 55b respectively engage the locking cam 44 thereby preventing rotation of the pinion 48 and mutilated teeth 57a and 57b extend vertically, as shown. Referring now to FIG. 9, energization of coil 78 in turn attracts clapper 84 toward the magnetic frame 74 thereby actuating link 92 in the direction shown by the arrow 138 to pivot reset arms 66 into engagement with cam 58b, it being observed that point 70 will initially engage the surface of cam 58b. Disengagement of the lower surface of reset arm 66 from plate 110 attached to lever member 104 results in spring 112 pivoting lever member 104 to move pinion 48 out of engagement, it being observed that full teeth 55c and 55d will engage resilient finger 122 of reed plate 120 with mutilated tooth 57b being disposed beside resilient finger 122 (see also FIG. 5). With pinion 48 thus moved a sufficient distance so that full teeth 55c and 55d engage reed plate 122, portion 54b is likewise moved a sufficient distance to be completely out of mesh with both the shortened teeth 128 and the full teeth 130 of full tooth gear 46. Thus, as clapper 84 continues to actuate levers 92 in the direction shown by the arrow 138, reset arm 66 will rotate cam 58 in the direction shown by the arrow 140, rotation of cam 58b, gear 46 and number wheel 34 being permitted by the fact that pinion portion 54b is completely out of mesh with gear 46.

It will be readily understood that number wheel 32 also has a heart-shaped cam 58a attached thereto, as shown in dashed lines in FIG. 9 and it will be further understood that the reset arm 66 associated with cam 58a will engage the same at the time when cam 58b attached to number wheel 34 reaches the same angular position as that of cam 58a. From that point on, cam 58a will also be engaged by its reset arm 66 and thereby to rotate the same and number wheel 32 in the direction shown by the arrow 144.

Turning now to FIG. 10, when the reset arms 66 have rotated cams 58 and the respective number of wheels to the zero position, points 68 and 70 will respectively and simultaneously engage dwell portions 59a and 59b of cams 58 whereupon cam rotation is terminated with the number wheels having been moved to the zero indication. Thus, when coil 78 is deenergized, springs 94 will return clapper 84, links 92 and reset arm 66 to their normal positions whereupon the lower surfaces of reset arm 66 will engage plate 110 of lever members 104 so as to move pinions 48 back into engagement with the respective gears as seen in FIG. 10. Here it will be observed that since under the assumed condition, pinion 48 was initially positioned with full teeth 55a and 55b engaging locking cam 44, no rotation of pinion 48 during the resetting operation is necessary since the full teeth 55a and 55b are already properly positioned to engage the locking cam 44 in the reset position as shown in FIG. 10. It will further be observed that in the reset position, the radial center line 134 of the segment of the full tooth gear 46 containing the full teeth 130 is aligned with the pinion portion 54b and that the pinion is engaging the full teeth 130, it being observed that there are five full teeth disposed on either side of the tooth of pinion portion 54b which meshes with the full tooth segment.

Referring now to FIG. 11, it is assumed that number wheel 32 is initially positioned so that the two-tooth gear 42 and locking cam 44 are in the middle of a transfer, i.e. with number wheel 32 between the zero and nine (9) positions, and that number wheel 34 is close to its reset position, i.e. between one (1) and zero. Under these conditions, full tooth 55a meshes with the teeth of the two tooth gear 42 and the corresponding cut-out portion in locking cam 44, and it will thus be observed that the full teeth 55a and 55c of pinion portion 56 are vertically disposed. It will further be seen that in the assumed position of number wheel 34, the full teeth 130 are engaged with pinion portion 54b and that cam 58 is within 18° of its reset position (shown in FIG. 10).

Now referring to FIG. 12 with the condition assumed above in connection with FIG. 11, when coil 78 is energized, it will be observed that when pinion 48 is moved downwardly, full tooth 55c of pinion portion 56 will engage resilient finger 122 substantially at right angles (see also FIG. 6). If, even in the course of a transfer, full tooth 55c of pinion portion 56 engages resilient finger 122 at an angle departing only slightly from the vertical, the downward force exerted on the pinion 48 by the spring 112 will have caused the pinion to rotate so that either full tooth 55d or 55b is also engaged with the resilient finger 122 thus moving pinion portion 54b completely out of engagement with all of the teeth of full tooth gear 46. However, assuming that the pinion portion 56 is in essence at "dead center" with tooth 55c engaging resilient finger 122 at substantially right angles so that it will not rotate under the influence of spring 112, it will be observed by reference to FIG. 12 that pinion portion 54b is moved only partially out of mesh with the full teeth 130 of gear 46. With number wheel 34 and cam 58b in the position shown in FIG. 12, clapper 84 will move a substantial distance and will in fact be very close to its fully picked-up position before point 70 of reset arm 66 engages cam 58. It being recalled that magnetic force varies inversely as the square of the air gap, it will be seen that in the position of the clapper shown in FIG. 12 at the instant that the point 70 of reset arm 66 engages cam 58, nearly maximum magnetic force is being exerted on the clapper 84 thus initiating rotation of cam 58 in the direction shown by arrow 140 and in turn of gear 46 on number wheel 34 in the direction shown by the arrow 142. This will in turn cause a full tooth 130a of gear 46 to engage tooth 59a of pinion portion 54b initiating rotation of the pinion 48 in the direction shown by the arrow 146. Observing now that the full tooth 55a of pinion portion 56 is likewise partially out of mesh with the two tooth gear 42, the initial rotation of pinion 48 imparted by engagement of full tooth 130a of gear 46 with tooth 59a of pinion portion 54b will be accommodated thus rotating pinion 48 sufficiently to move it off its "top dead center" position so that tooth 55b will move into engagement with resilient finger 122 under the influence of spring 112 thus in turn moving the pinion 48 downward sufficiently so that it comes completely out of mesh with all of the teeth of gear 46 and of course two tooth gear 42. Thus, the operating arms 66 respectively associated with cams 58a and 58b will rotate their respective cams and in turn number wheels 32 and 34 to the zero positions, the deenergization of coil 78 thus restoring the device to the posture shown in FIG. 10.

Referring now finally to FIGS. 14 and 15, it is again assumed that number wheel 32 is positioned so that its two toothed gear 42 and locking cam 44 are in the middle of a tarnsfer, i.e. between numbers zero and nine (9), however in this case it is assumed that the number wheel 34 is in a position so that its cam 58b is near its maximum excursion, as shown in FIG. 14. Here, with full teeth 55a and 55c vertically aligned so that tooth 55c engages resilient finger 122 substantially at right angles thereto and thus being at its "top dead center" position, it will be observed that gear 46 is now oriented so that the cut-down teeth 128 normally mesh with pinion portion 54b. In accordance with an important feature of my invention, resilient fingers 122 of reed plate 120 are positioned so that when pinion 48 is moved downwardly and a full tooth 55 of mutilated portion 56 engages a resilient finger 122 substantially at right angles thereto, pinion portion 54b is moved a distance sufficient to be out of mesh with the cut-down teeth 128 but insufficient to be out of mesh with the full teeth 130. Now, with cam 58b oriented near its maximum excursion as shown in FIG. 14, clapper 84 will have moved very little before point 68 of operating arm 66 engages the surface of cam 58b, and thus minimum magnetic force is available for rotating the cam. If the cut-down teeth 128 were not provided, sufficient magnetic force might not be available to initiate rotation of cam 58b and gear 46 in turn to initiate rotation of pinion 48 as above described. However, it will be observed that in accordance with my invention with cam 58b at or near its maximum exercusion, the segment of gear 46 having the cut-down teeth 128 has its radial center line aligned with pinion 48, i.e. with five of the cut-down teeth 128 normally being positioned on either side of pinion portion 54b. Thus, when pinion 48 is moved downwardly and with pinion portion 54b moving a distance sufficient to be out of mesh with the cut-down teeth 128 but not sufficient to be out of mesh with the full teeth 130 as described above, gear 46 and number wheel 34 are now free to rotate with respect to pinion 48 and thus, rotation of gear 46 and number wheel 34 in the direction shown by the arrow 142 will be initiated by engagement of reset arm 66 with cam 58b in the direction shown by the arrow 140. As this rotation of cam 58b and gear 46 continues, clapper 84 moves progressively closer to magnetic frame 74 with the magnetic force available thus increasing as a square function of the length of air gap 150. Thus, referring specifically to FIG. 15, when number wheel 34 has been rotated to a position between the numerals 3 and 2 and with cam 58b oriented as shown, full tooth 130b will now engage tooth 59a of pinion portion 54b tending to rotate the same in the direction shown by the arrow 146 as above described, clapper 84 having now moved sufficiently far that air gap 150 is in turn sufficiently small so that sufficient magnetic force is now available to permit reset arm 66 to continue to rotate cam 58b and gear 46, to in turn initiate rotation of pinion 48, as previously described. In addition to the availability of substantially increased magnetic force in the attitude of cam 58b shown in FIG. 15 at which point the first full tooth 130b comes into engagement with tooth 59a of pinion portion 54b, it will be observed that considerable momentum in the system is built up in the rotation of cam 58b, gear 46 and number wheel 34 from the position shown in FIG. 14 to that shown in FIG. 15 which further contributes to the ability of gear 46 to initiate rotation of pinion 48 in the position of FIG. 15 whereas rotation would not at all have been assured in the position of the cam 58b, gear 46 and number wheel 34 shown in FIG. 14 (without the provision of the cut-down teeth 128).

While I have employed a 180° segment of cut-down teeth, a segment having a greater or lesser extent may be employed in a given counter, it being merely necessary in accordance with my invention that the cut-down teeth mesh with the pinion when the cam is adjacent its maximum excursion and the full teeth mesh with the pinion when the cam is adjacent its reset position. I have found that with the above described construction of my invention in which the full tooth gear of each transfer mechanism has a plurality of cut-down teeth and in which the resilient fingers of the reed plate are positioned so that the pinion is moved a distance sufficient to come out of mesh with the cut-down teeth but not to come out of mesh with the full teeth when a tooth of the pinion engages the resilient finger substantially at right angles thereto, positive resetting of all number wheels of the counter to the desired position is provided with a single impulse, i.e. a single pulse energizing coil 78, whereas in all prior devices known to the present applicant, repeated impulses or actuations were at times required to effect resetting under the conditions above described.

While I have illustrated and described a specific embodiment of my invention, further modifications and improvements will occur to those skilled in the art and I desire therefore in the appended claims to cover all modifications which do not depart from the spirit and scope of my invention.

What is claimed is:

1. In a revolution counter of the continuous rotation, impulse-reset type comprising lower and higher order number wheels; transfer mechanism for rotating the higher order wheel a predetermined incremental amount in response to a predetermined rotation of the lower the order wheel, said mechanism comprising a segmental gear secured to the lower order wheel, a full tooth gear secured to the higher order wheel, and a transfer pinion operatively connecting said gears; and means for resetting both of said wheels to predetermined positions comprising first and second cam means respectively secured to said lower and higher order number wheels, each of said cam means having high and dwell portions, said cam means respectively having normal positions when said wheels are in said predetermined position, operating means, respectively engageable with said cam means for moving the same to said normal positions thereof with said operating means respectively engaging said dwell portions, means for moving said pinion out of engagement with said gears, means for actuating said operating and moving means, and abutment means for engaging said pinion when the same is moved out of engagement with said gears; the improvement wherein the teeth in a first segment of said full tooth gear are radially shorter than the teeth of the remaining segment of said full tooth gear, said pinion normally engaging the teeth of said remaining segment when said higher order wheel is adjacent said predetermined position and engaging the teeth of said first segment when said higher order wheel is positioned so that the high portion of said second cam is adjacent a position to be engaged by said operating means, and wherein said abutment means is positioned so that said pinion is moved a distance sufficient to disengage the teeth of said first segment but not sufficient to disengage the teeth of said remaining segment of said full tooth gear when a tooth of said pinion engages said abutment means substantially at right angles thereto.

2. The combination of claim 1 wherein the radial centerline of said first segment of said full tooth gear is generally in radial alignment with said pinion when the high portion of said second cam is in a position to be engaged by the respective operating means, and wherein the radial centerline of said remaining segment is generally in radial alignment with said pinion when said cam is in said normal position.

3. The combination of claim 1 wherein said cams are respectively of the heart-shaped type, wherein said first segment of said full tooth gear extends for substantially 180° with its radial centerline generally in radial alignment with said pinion when the high portion of said second cam is in a position to be engaged by the respective operating means, and wherein the radial centerline of said remaining segment is generally in radial alignment with said pinion when said cam is in said normal position.

4. The combination of claim 1 wherein said segmental gear of said transfer mechanism has two teeth, said transfer mechanism further comprising a locking cam secured to said segmental gear and cooperating therewith, wherein said transfer pinion comprises a full tooth portion meshing with said full tooth gear and segmental gear respectively and a mutilated portion cooperating with said locking cam and having every other tooth removed, wherein said cams are respectively of the heart-shaped type, and wherein said abutment means comprises a flat strip of spring material positioned to be engaged by the mutilated portion of said pinion only, said strip being further positioned so that said full tooth portion of said pinion is moved a distance sufficient to be out of mesh with the teeth of said first segment but not out of mesh with the teeth of said second segment of said full tooth gear when said pinion is moved and one tooth of said mutilated portion thereof engages said strip substantially at right angles thereof, but so that said full tooth portion of said pinion is moved a distance sufficient to be out of mesh with the teeth of said remaining segment of said full tooth gear when said pinion is moved and two teeth of said mutilated portion thereof engage said strip.

5. A continuous rotation impulse-reset revolution counter comprising; first and second number wheels on a first shaft; a transfer mechanism for rotating said second wheel a predetermined incremental amount in response to a predetermined rotation of said first member wheel comprising a two-tooth gear and cooperating locking cam rotatable with said first wheel, a full tooth gear rotatable with said second wheel, and a transfer pinion on a second shaft for connecting said gears, said second shaft being parallel with and spaced from said first shaft, said pinion having a full tooth portion for meshing respectively with said gears and a mutilated portion having every other tooth removed for cooperating with said locking cam; means for moving said second shaft in a direction to move said pinion out of mesh with said gears; first and second heart-shaped cams respectively rotatable with said wheels and each having a high point and dwell portion; means for respectively engaging said cams to rotate the same to predetermined positions; said full tooth gear having a plurality of adjacent teeth which have a radial height less than the radial height of the remaining teeth; said full tooth portion of said pinion normally meshing with said plurality of teeth when the high point of said second cam is adjacent a position to be engaged by the respective engaging means and normally meshing with said remaining teeth when the dwell portion of said second cam is adjacent a position to be engaged by the respective engaging means; and a flat spring member lying in a plane generally perpendicular to a plane through the said shafts and engageable with the mutilated portion of said pinion for limiting the movement thereof, said spring member being spaced from said second shaft a distance so that when said second shaft is moved and one tooth of said mutilated portion of said pinion engages said spring member at substantially right angles thereto said full tooth portion is moved a distance sufficient to be out of mesh with said plurality of teeth but not sufficient to be out of mesh with said remaining teeth of said full tooth gear, and so that when said second shaft is moved and two teeth of said mutilated portion of said pinion engage said spring member said full tooth portion is moved a distance sufficient to be out of mesh with all of the teeth of said full tooth gear.

6. The combination of claim 5 further comprising means resiliently biasing said second shaft in said direction, and a solenoid having an operating coil and an armature operatively connected to said cam engaging means for actuating the same responsive to energization of said coil, said cam rotating means normally urging said second shaft moving means into a position to cause meshing of said pinion with said gears when said coil is not energized.

7. In a revolution counter, a transfer mechanism and number wheel resetting assembly comprising: a segmental gear; a full tooth gear; a transfer pinion for operatively connecting said gears, said pinion being movable in a direction to come out of mesh with said gears; first and second cam means respectively operatively connected to said segmental and full tooth gears and each having high and dwell portions; operating means respectively engageable with said cam means for moving the same to predetermined positions; said full tooth gear having a plurality of adjacent teeth which have a radial height less than that of the remaining teeth, said pinion meshing with said plurality of teeth when said high portion of said second cam is positioned to be engaged by the respective operating means and meshing with said remaining teeth when said dwell portion of said second cam is positioned to be engaged by the respective operating means; and abutment means for engaging said pinion when the same is moved and for limiting the movement thereof, said abutment means being positioned so that said pinion moves a distance sufficient to come out of mesh with said plurality of teeth but not sufficient to come out of mesh with said remainder of the teeth of said full tooth gear when said pinion is moved so that one tooth thereof engages said abutment means substantially at right angles thereto.

8. In a revolution counter, a transfer mechanism and number wheel resetting assembly comprising: a two-tooth gear and cooperating locking cam; a full tooth gear; a transfer pinion having a full tooth portion normally engaging said gears and a mutilated portion with every other tooth removed normally cooperating with said locking cam, said pinion being movable in a direction to come out of mesh with said gears; first and second heart-shaped cams respectively operatively connected to said two-tooth and full tooth gears and each having a high point and a dwell portion; operating means respectively engageable with said cams for moving the same to predetermined positions in which said operating means respectively engages said dwell portions; a first segment of said full tooth gear having teeth of a radial height less than the radial height of the teeth of the remaining segment, said full tooth portion of said pinion normally meshing with teeth of said first segment when the high point and portions of said second cam adjacent thereto are positioned to be engaged by the respective operating means, said full tooth portion of said pinion normally meshing with the teeth of said remaining segment when the dwell portion and portions of said second cam adjacent thereto are positioned to be engaged by the respective operating means; and a flat spring member disposed to engage the mutilated portion only of said pinion when the same is moved in said direction, said member being normally spaced by a predetermined amount from said pinion when the same is meshed with said gears, said spacing being such that said full tooth portion of said pinion moves a distance sufficient to come out of mesh with said first segment but not sufficient to come out of mesh with said remaining segment when said pinion is moved in said direction and is in a position so that one tooth of said mutilated portion engages said member substantially at right angles thereto, and such that said full tooth portion of said pinion moves a distance sufficient to come out of mesh with all of the teeth of said full tooth gear when said pinion is moved in said direction and is in a position so that two teeth of said mutilated portion engage said member.

References Cited in the file of this patent
UNITED STATES PATENTS
2,769,596  Loosli _____ Nov. 6, 1956